United States Patent
Noebel

(12) 
(10) Patent No.: US 9,227,717 B2
(45) Date of Patent: Jan. 5, 2016

(54) AIRCRAFT FUSELAGE REINFORCEMENT SYSTEM

(75) Inventor: Torsten Noebel, Neuendeich (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 13/519,327

(22) PCT Filed: Dec. 29, 2010

(86) PCT No.: PCT/EP2010/070826
§ 371 (c)(1),
(2), (4) Date: Jun. 27, 2012

(87) PCT Pub. No.: WO2011/080286
PCT Pub. Date: Jul. 7, 2011

(65) Prior Publication Data
US 2012/0286093 A1    Nov. 15, 2012

Related U.S. Application Data

(60) Provisional application No. 61/290,511, filed on Dec. 29, 2009.

(30) Foreign Application Priority Data

Dec. 29, 2009 (DE) .......................... 10 2009 060 695

(51) Int. Cl.
*B64C 1/12*    (2006.01)
*B64C 1/06*    (2006.01)
*B64C 1/00*    (2006.01)

(52) U.S. Cl.
CPC . *B64C 1/061* (2013.01); *B64C 1/12* (2013.01); *B64C 2001/0072* (2013.01)

(58) Field of Classification Search
CPC .... B64C 1/061; B64C 2001/0072; B64C 1/12
USPC ......................................................... 244/119
See application file for complete search history.

(56) References Cited

U.S. PATENT DOCUMENTS

| | | | | |
|---|---|---|---|---|
| 2,412,778 | A  * | 12/1946 | Kosek ........................... | 244/120 |
| 4,053,667 | A  * | 10/1977 | Smith ........................... | 428/36.1 |
| 5,271,986 | A  * | 12/1993 | Dublinski et al. ............. | 428/156 |
| 6,187,411 | B1 * | 2/2001 | Palmer ........................... | 428/102 |
| 6,613,258 | B1 * | 9/2003 | Maison et al. ................. | 264/102 |

(Continued)

FOREIGN PATENT DOCUMENTS

| | | |
|---|---|---|
| CN | 1270551 A | 10/2000 |
| FR | 2700407 A1 | 7/1994 |
| WO | 2008/037847 A1 | 4/2008 |

OTHER PUBLICATIONS

International Preliminary Report on Patentability issued on Jul. 19, 2012 in corresponding application No. PCT/EP2010/070826.

(Continued)

*Primary Examiner* — Tien Dinh
*Assistant Examiner* — Michael A Fabula
(74) *Attorney, Agent, or Firm* — Carter, DeLuca, Farrell & Schmidt, LLP

(57) ABSTRACT

A fuselage of a fiber-reinforced composite material for an aircraft with a skin and with a multiplicity of circumferential stiffeners and only a small number of longitudinal stiffeners, the skin having a multiplicity of local reinforcements.

10 Claims, 5 Drawing Sheets

(56) References Cited

U.S. PATENT DOCUMENTS

| | | | |
|---|---|---|---|
| 8,052,826 B2 * | 11/2011 | Burpo et al. | 156/257 |
| 8,480,031 B2 * | 7/2013 | Gauthie et al. | 244/120 |
| 8,636,252 B2 * | 1/2014 | Pook et al. | 244/119 |
| 2003/0080251 A1 | 5/2003 | Anast | |
| 2006/0226287 A1 | 10/2006 | Grantham et al. | |
| 2007/0108347 A1 | 5/2007 | Sankrithi et al. | |
| 2008/0164372 A1 * | 7/2008 | Gallet et al. | 244/119 |
| 2010/0258676 A1 * | 10/2010 | Gauthie et al. | 244/131 |
| 2010/0282905 A1 * | 11/2010 | Cazeneuve et al. | 244/120 |
| 2011/0073708 A1 * | 3/2011 | Biornstad et al. | 244/1 A |

OTHER PUBLICATIONS

International Search Report for Appln. No. PCT/EP2010/070826 mailed Aug. 18, 2011.
Chinese Office Action CN102741119, dated Apr. 14, 2014.
German Office Action DE102009060695, dated Jul. 6, 2011.
Second Office Action for Chinese Appin. No. CN 201080060014.2 dated Feb. 13, 2015.

* cited by examiner

Section A-A

Section A-A

Section A-A

Section B-B

AIRCRAFT FUSELAGE REINFORCEMENT SYSTEM

TECHNICAL FIELD

The invention concerns an aircraft fuselage.

BACKGROUND OF RELATED ART

Aircraft fuselages are traditionally embodied in a metallic form of construction with a backing structure of a multiplicity of longitudinal and circumferential stiffeners. While the manufacture of such aircraft fuselages is indeed very easy to control, the aircraft fuselages, by virtue of the metallic materials, have a relatively high weight. In addition to the high weight of the metallic aircraft fuselages the high number of parts of the longitudinal stiffeners and their attachment, or integration, are particularly labour-intensive. In recent times, therefore, a growing trend towards the replacement of the metallic fuselages with fuselages of fibre-reinforced composite materials can be observed. Here the fuselages and their backing structures are usually copies of metallic fuselages. This means that longitudinal stiffeners accommodate the longitudinal loads, circumferential stiffeners accommodate the circumferential loads and moments, while the skin primarily accommodates the internal pressure and also longitudinal and shear loads.

In addition attempts are being made, as shown for example in U.S. 2007/0108347 A1 to replace the conventional arrangement of the longitudinal and circumferential stiffeners by an integral stiffening structure in the form of a lattice, in which a multiplicity of stiffeners located in one plane, and aligned at an angle to the longitudinal axis of the fuselage, are joined in crossing regions. However, what is problematical in the composite form of construction with the lattice-type backing structure is the large number of stiffeners and their joining in the crossing regions, which requires complex production devices. Furthermore the lattice-type backing structure is not optimally designed for the loads that occur, but represents somewhat of a compromise in terms of accommodating all the loads to be anticipated.

SUMMARY

The object of the present invention is to create an aircraft fuselage that avoids the disadvantages cited above and is specifically matched to the loads occurring, and also to create a skin field for such an aircraft fuselage.

An inventive fuselage of a fibre-reinforced composite material for an aircraft has a skin and a backing structure of longitudinal and circumferential stiffeners for purposes of stiffening the skin. In accordance with the invention a multiplicity of local reinforcements are designed on the skin. In the inventive fuselage the main functions of the structural elements, such as skin and backing structure, are reassigned. The skin essentially accommodates only shear loads and internal pressure, while a few local longitudinal stiffeners carry longitudinal loads exclusively, or almost exclusively. Now as before the circumferential stiffeners primarily accommodate circumferential loads and moments. Thus the skin by means of a suitable laminate form of construction can be configured to be very flexible in the longitudinal direction, so that as a result of the low stiffness thus arising the skin also has low stresses. These lead to the fact that at least pressure bulges occur later. The skin can be better optimised for the shear loads, since only the shear loads and the internal pressure are primarily of concern. The local reinforcements thereby effect a local increase in stiffness and prevent the bulging. Thus in comparison to conventional aircraft fuselages only a very few longitudinal stiffeners are required. For example, a reduction of the longitudinal stiffeners by a factor of between 6 and 12 is conceivable. Here the number of longitudinal stiffeners required is determined by, amongst other factors, fail-safe requirements. Thus, for example, one regulation states that in the event of uncontrollable damage to an engine, in which flying rotor blades can penetrate the fuselage, the fuselage must continue to have a certain level of stability to ensure a safe landing. In other words, whereas in the optimal case only a few longitudinal stiffeners would be required, crash regulations can demand that more longitudinal stiffeners are necessary.

In one preferred example of embodiment the reinforcements are designed as elevations on the inner side of the skin, which have a greater extent in the longitudinal direction than in the transverse or circumferential direction. In this respect they act, so to speak, as a multiplicity of individual longitudinal stiffeners arranged one behind another in the longitudinal direction. They can be designed integrally with the skin, or can be subsequently attached to the latter by means of a bonding technique. In one example of embodiment provision is made for the reinforcements to be designed such that the material thickness of the skin is locally reduced so that a multiplicity of depressions are formed as a type of corrugation; these are spaced apart from one another by means of the skin sections in which the thickness is not reduced, the latter then forming the reinforcements.

The reinforcements can be designed both as hollow bodies and also as solid bodies. They are preferably designed as hollow bodies with foam cores, since by this means a maximum local stiffening of the skin is achieved with a minimal weight.

The reinforcements preferably form rows in both the longitudinal and the circumferential directions, between which extend the circumferential stiffeners and in some individual cases the longitudinal stiffeners, such that the circumferential and longitudinal stiffeners are directly attached to the skin. However, in one example of embodiment provision is also made for the circumferential and longitudinal stiffeners to be attached to the skin via foot sections of the reinforcements. The arrangement of the reinforcements relative to one another, their number and their size and shape, are determined by the local loads occurring and can thus vary greatly within the fuselage. Thus the reinforcements in the longitudinal direction and/or circumferential direction can also be arranged such that they are displaced relative to one another, or one reinforcement can, for example, have double the length and/or a different height or extent in the radial direction compared with adjacent reinforcements. Similarly the reinforcements in regions of the fuselage with high local loads can be positioned relative to one another, i.e. can be present, at a different spacing, and/or in different numbers, compared with regions of the fuselage with low local loads.

In particular the reinforcements are embodied such that the design has significantly fewer longitudinal stiffeners than rows of longitudinal reinforcements. Thus examples of embodiment provide for just four, eight or twelve longitudinal stiffeners evenly distributed over the inner circumference of the fuselage.

Preferred longitudinal stiffeners, because they are particularly easy to manufacture, have one foot section, from which two approximately parallel blade-like webs extend. The circumferential stiffeners have, for example, a C-type profile with a lower flange, an upper flange, a web connecting the two flanges with one another, and with an inner flange. Such longitudinal and circumferential stiffeners are simple to manufacture in terms of the production engineering. However, the shape i.e. the profile of the longitudinal and circumferential stiffeners is variable. Circumferential stiffeners with an omega profile are, for example, also conceivable.

An inventive skin field of a fibre-reinforced composite material for an aircraft fuselage has a multiplicity of local stiffeners on its inner surface. This allows the skin field to be locally matched specifically to the loads occurring, and thus enables a significant reduction in the number of longitudinal stiffeners.

Other advantageous examples of embodiment are the subjects of further subsidiary claims.

BRIEF DESCRIPTION OF THE DRAWINGS

Preferred examples of embodiments of the invention are elucidated in more detail with the aid of schematic representations as follows.

DETAILED DESCRIPTION

In the figures the same design elements have the same reference numbers, wherein where there are a plurality of the same design elements in one figure for reasons of clarity, just some of the elements are provided with a reference number.

Figure 1:
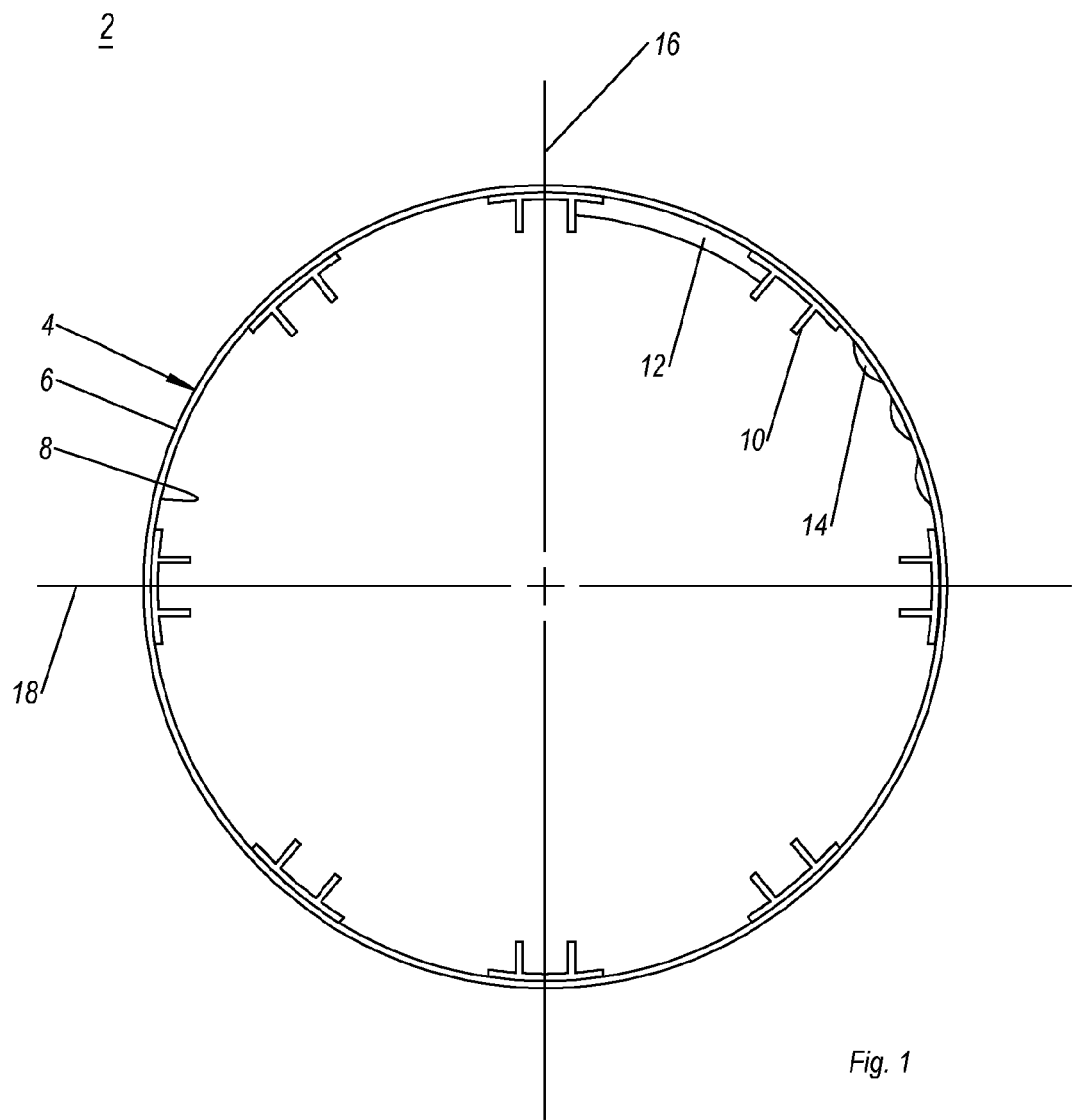
FIG. 1 shows a cross-section through a first inventive fuselage.

In accordance with the cross-sectional representation in FIG. 1 an inventive fuselage 2 has a skin 4, which is manufactured from a multiplicity of skin fields 6 that are connected with one another along their longitudinal sides. In the interests of clarity the individual skin fields 6, such as, for example, an upper shell, a lower shell, and two side shells connecting the lower and the upper shell with one another, are not shown as separate components. The skin fields 6 consist of fibre-reinforced composite materials such as CFRPs, and have on their inner surfaces 8 a backing structure, similarly of fibre-reinforced composite materials, which is formed from a few longitudinal stiffeners 10, a multiplicity of circumferential stiffeners 12, and also a multiplicity of local reinforcements 14. The circumferential stiffeners 12 and the reinforcements 14 extend over the whole of the inner circumference of the fuselage 2, i.e. are distributed over the latter, however, in the interests of clarity only one section of the circumferential stiffeners 12 is represented together with a small number of the reinforcements 14.

In the example shown 8 longitudinal stiffeners are provided, which in each case are distributed in pairs diametrically opposite one another and evenly spaced apart from one another over the inner circumference of the fuselage 2. Here four longitudinal stiffeners 10, i.e. two pairs of longitudinal stiffeners, are in each case symmetrically or approximately symmetrically located on the vertical axis 16 and the transverse axis 18 of the fuselage 2.

Figure 2:
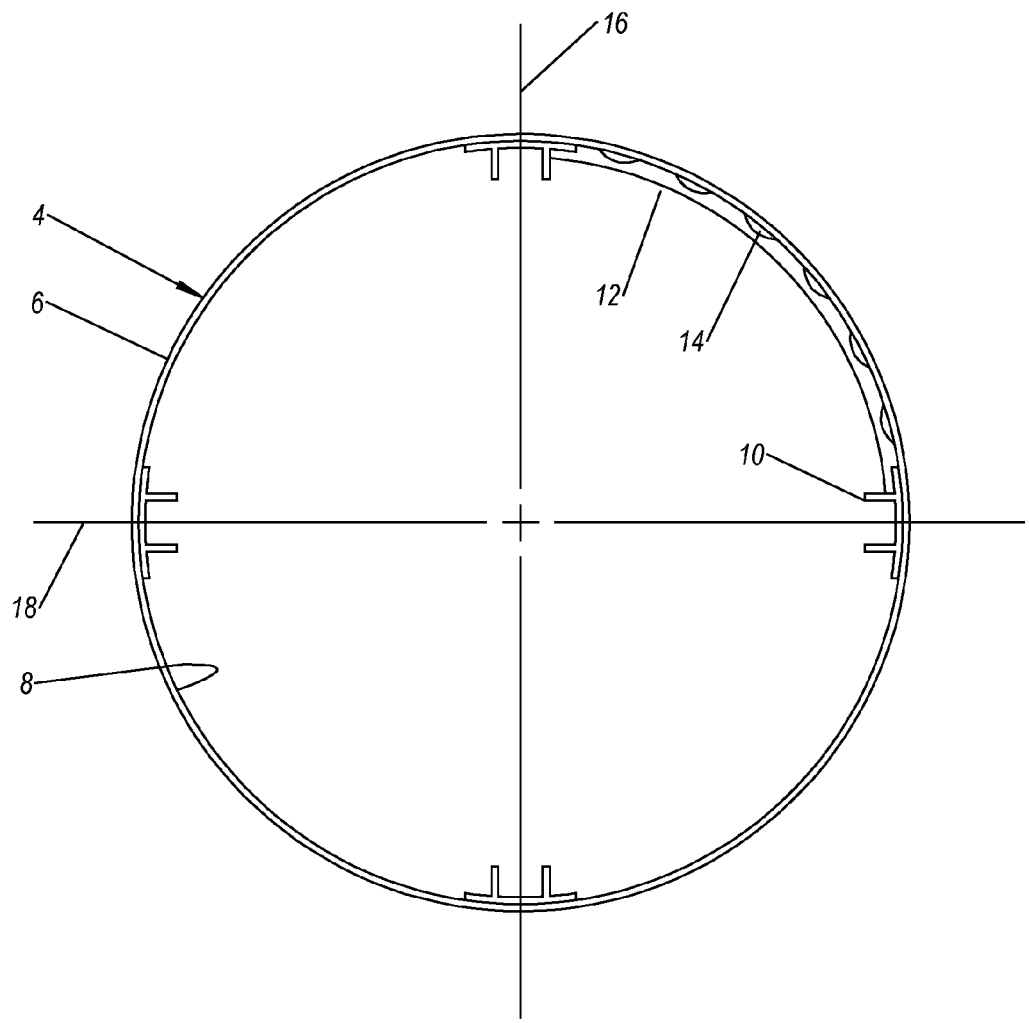
FIG. 2 shows a cross-section through a second inventive fuselage.

However, in accordance with the representation in FIG. 2 it is also conceivable to reduce the number of longitudinal stiffeners 10 to four, for example, wherein two longitudinal stiffeners are in each case positioned on the vertical axis 16 and two longitudinal stiffeners 10 are positioned on the transverse axis 18.

Figure 3:
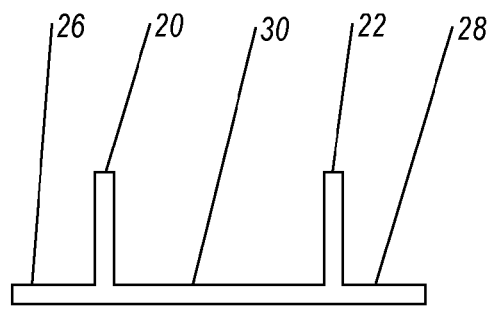
FIG. 3 shows a cross-section through an inventive longitudinal stiffener.

The longitudinal stiffeners 10 have, as shown in FIG. 3, in each case two blade-type webs 20, 22, running approximately in parallel, which extend approximately orthogonally from a foot section 24 with, in accordance with the representation in the figure, a left-hand outer flange 26, a right-hand outer flange 28, and an inner flange 30 arranged between the outer flanges 26, 28, i.e. between the webs 20, 22. The foot section 24 is designed to be curved (not shown) in accordance with the inner surface 8 of the skin 4, i.e. of the skin fields 6, so that the webs 20, 22, when viewed more accurately, are seen to be slightly inclined towards one another. By virtue of the small number of longitudinal stiffeners 10 in total these have a particularly stiff laminate in the longitudinal direction.

Figure 4:
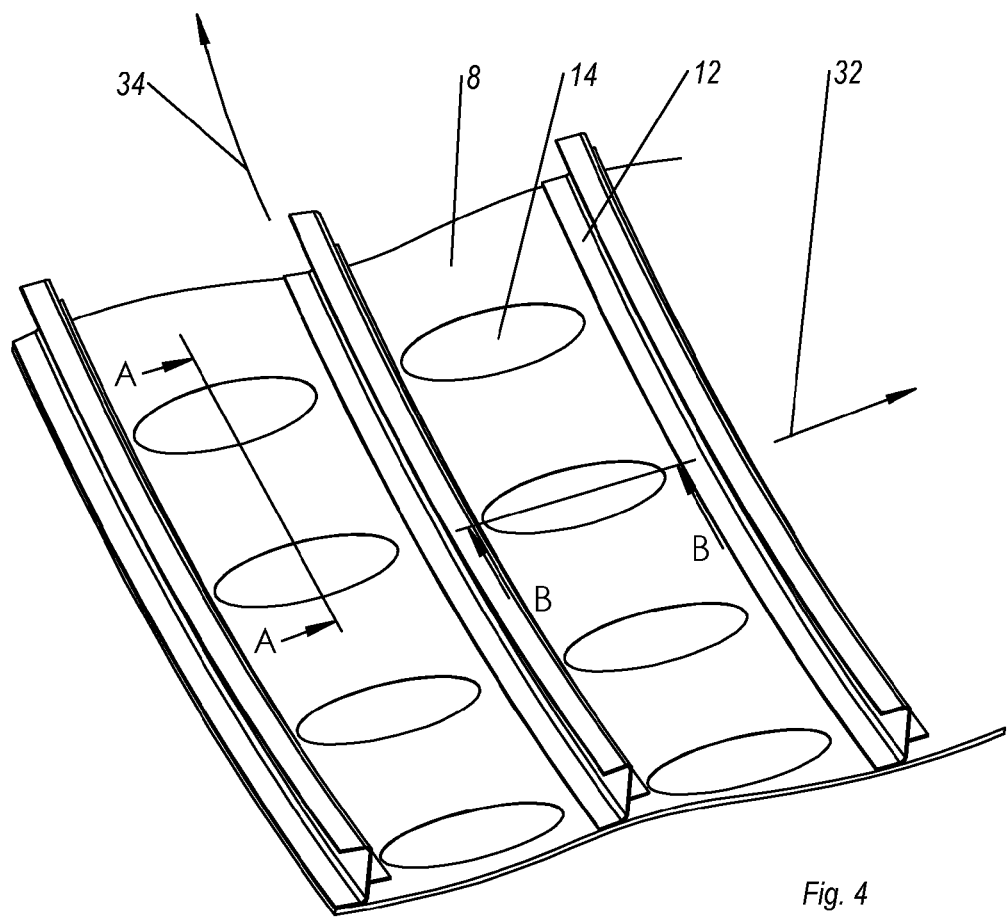
FIG. 4 shows a plan view onto an inventive skin field.
Figure 5:
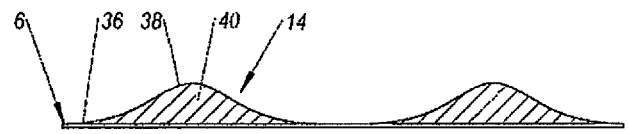
FIGS. 5-6 show cross-sections through an inventive local reinforcement from FIG. 4.
Figure 5:
Figure 6:
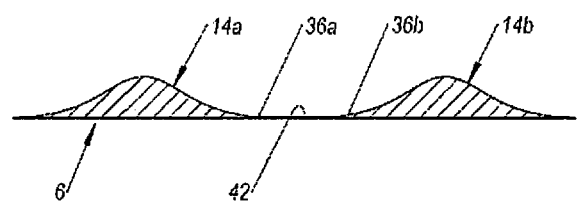

In accordance with the representation in FIG. 4 the reinforcements 14 have in plan view the shape of a lens, with a greater longitudinal extent than transverse, i.e. circumferential, extent, and in the longitudinal direction 32 and also in the circumferential direction 34 are arranged behind one another or side-by-side respectively, spaced apart from one another. They have in each case, as shown in the longitudinal section in FIG. 5 a circumferential foot section 36, which encompasses an elevation 38 in the form of a bulge or hill. The elevation 38 bounds a cavity, in which a foam-type core 40 is arranged. The reinforcements 14 with their peripheral foot sections are spaced apart from one another; however, in an example of embodiment shown in FIG. 6 provision is made that the foot sections 36a, 36b merge flush into one another, so that in the circumferential direction a planar transitional surface 42 is formed between adjacent reinforcements 14a, 14b.

Figure 7:
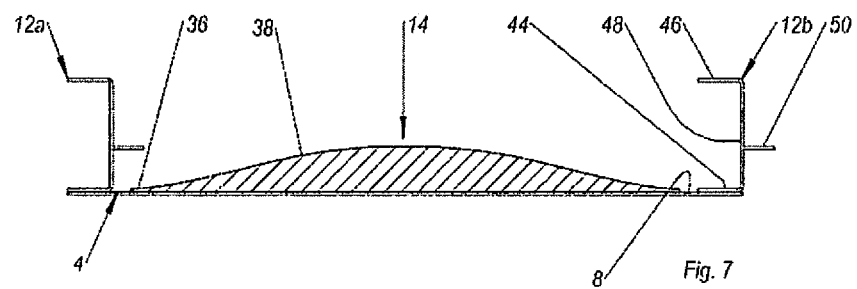
FIG. 7 shows a longitudinal section through an inventive local reinforcement from FIG. 4.

In accordance with the longitudinal section in FIG. 7, in each case the elevations 38 merge smoothly at their ends into their circumferential foot sections 36, so that no sudden, i.e. stepped, transitions are formed between the foot sections 36 and the elevations 38.

In accordance with FIG. 7 the circumferential stiffeners 12 are arranged side-by-side in the longitudinal direction, wherein in each case one reinforcement 14 is arranged between two adjacent circumferential stiffeners 12a, 12b. They have in each case an essentially C-shaped profile with a lower flange 44 with which they make contact with the inner surface 8 of the skin fields 6, i.e. of the skin 4, an upper flange 46, a web 48 connecting the flanges 44, 46 with one another, and also an inner flange 50 facing away from the flanges 44, 46.

Figure 8:
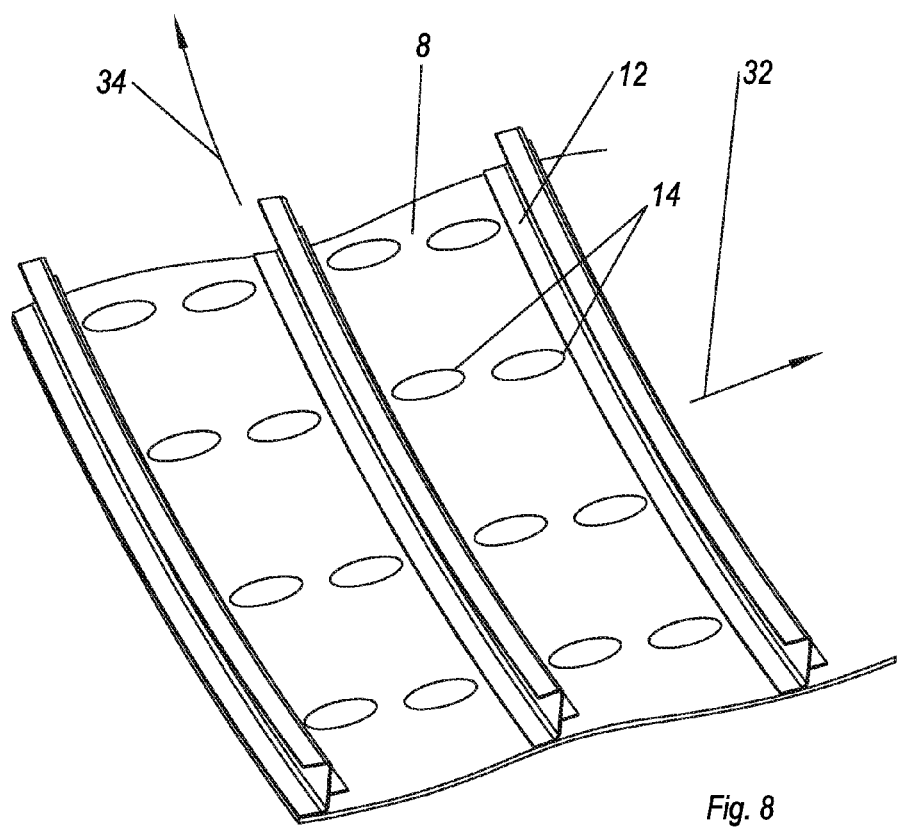
FIG. 8 shows a plan view onto another inventive skin field.

In accordance with FIG. 8 the circumferential stiffeners 12 are arranged side-by-side in the longitudinal direction, wherein in each case columns and rows of reinforcements 14 are arranged between two adjacent circumferential stiffeners 12a, 12b.

Disclosed is a fuselage 2 of a fibre-reinforced composite material for an aircraft with a skin 4 and with a multiplicity of circumferential stiffeners 12 and only a small number of longitudinal stiffeners 10, wherein the skin 4 has a multiplicity of local reinforcements 14; also disclosed is a skin field 6 for purposes of forming such a fuselage.

REFERENCE SYMBOL LIST

2 Fuselage
4 Skin
6 Skin fields
8 Inner surface
10 Longitudinal stiffener

12 Circumferential stiffener
14 Reinforcement
16 Vertical axis
18 Transverse axis
20 Web
22 Web
24 Foot section
26 Outer flange
28 Outer flange
30 Inner flange
32 Longitudinal direction
34 Circumferential direction
36 Foot section
38 Elevation
40 Core
42 Transitional surface
44 Lower flange
46 Upper flange
48 Web
50 Inner flange

What is claimed is:

1. An aircraft fuselage of fibre-reinforced composite material, comprising:
   a skin including:
      a multiplicity of local reinforcements; and
   a backing structure for stiffening the skin, comprising:
      longitudinal stiffeners, and
      circumferential stiffeners,
      wherein the skin includes a multiplicity of local reinforcements,
      wherein two or more local reinforcements form a row disposed between adjacent circumferential stiffeners,
      wherein the local reinforcements extend in a longitudinal direction to a greater extent than in a circumferential direction of the fuselage,
      wherein in a plan view, the local reinforcements each have an oval shape,
      wherein in cross-section, the local reinforcements each have an elevation in the form of a bulge having a foot section disposed on a circumferential edge thereof,
      wherein a crown of the bulge extends towards a center region of the fuselage, and
      wherein the foot section of each adjacent local reinforcement merges flush into one another in a circumferential direction.

2. The fuselage in accordance with claim 1, wherein the multiplicity of local reinforcements are integral with the skin.

3. The fuselage in accordance with claim 1, wherein the multiplicity of local reinforcements are embodied as hollow bodies.

4. The fuselage in accordance with claim 1, wherein the multiplicity of local reinforcements have a foam core.

5. The fuselage in accordance with claim 1, wherein more longitudinal rows of local reinforcements are provided than longitudinal stiffeners.

6. The fuselage in accordance with claim 1, wherein 4, 8 or 12 longitudinal stiffeners are provided around the circumference of the fuselage and are arranged in diametrically opposed pairs.

7. The fuselage in accordance with claim 1, wherein each of the longitudinal stiffeners has two approximately parallel web sections connected by a flange.

8. A skin field of fibre-reinforced composite material having circumferential stiffeners and longitudinal stiffeners for an aircraft fuselage, comprising:
   a multiplicity of local reinforcements on an inner surface of the skin field,
   wherein two or more local reinforcements form a row disposed between adjacent circumferential stiffeners,
   wherein the local reinforcements extend in the longitudinal direction to a greater extent than in the circumferential direction of the fuselage,
   wherein in a plan view, the local reinforcements each have an oval shape,
   wherein in cross-section, the local reinforcements each have elevations in the form of a bulge having a foot section disposed on a circumferential edge thereof,
   wherein a crown of each bulge extends towards a center region of the fuselage, and
   wherein the foot section of each adjacent local reinforcement merges flush into one another in a circumferential direction.

9. An aircraft fuselage of fibre-reinforced composite material for an aircraft, comprising:
   a skin including:
      a multiplicity of local reinforcements; and
   a backing structure for stiffening the skin, comprising:
      longitudinal stiffeners, and
      circumferential stiffeners,
      wherein the skin includes a multiplicity of local reinforcements,
      wherein two or more of the local reinforcements form a column disposed between adjacent longitudinal stiffeners,
      wherein the local reinforcements extend in a longitudinal direction to a greater extent than in a circumferential direction of the fuselage,
      wherein in a plan view, the local reinforcements each have an oval shape,
      wherein in cross-section, the local reinforcements each have elevations in the form of a bulge having a foot section disposed on a circumferential edge thereof,
      wherein a crown of each bulge extends towards a center region of the fuselage, and
      wherein the foot section of each adjacent local reinforcement merges flush into one another in the circumferential direction.

10. A skin field of fibre-reinforced composite material having circumferential stiffeners and longitudinal stiffeners for an aircraft fuselage, comprising:
    a multiplicity of local stiffeners on an inner surface of the skin field,
    wherein two or more local reinforcements form a column disposed between adjacent longitudinal stiffeners,
    wherein the local reinforcements extend in a longitudinal direction to a greater extent than in a circumferential direction of the fuselage,
    wherein in a plan view, the local reinforcements each have an oval shape, wherein in cross-section, the local reinforcements each have an elevation in the form of a bulge having a foot section disposed on a circumferential edge thereof,
    wherein a crown of each bulge extends towards a center region of the fuselage, and
    wherein the foot section of each adjacent local reinforcement merges flush into one another in the circumferential direction.

* * * * *